United States Patent
Matsubara et al.

(10) Patent No.: US 9,630,264 B2
(45) Date of Patent: Apr. 25, 2017

(54) CUTTING INSERT FOR A MILLING CUTTER

(71) Applicant: SUMITOMO ELECTRIC HARDMETAL CORP., Itami-shi, Hyogo (JP)

(72) Inventors: Kouki Matsubara, Itami (JP); Atsuhiko Maeta, Itami (JP); Katsuya Nakakihara, Itami (JP)

(73) Assignee: SUMITOMO ELECTRIC HARDMETAL CORP., Itami (JP)

( * ) Notice: Subject to any disclaimer, the term of this patent is extended or adjusted under 35 U.S.C. 154(b) by 215 days.

(21) Appl. No.: 14/409,626

(22) PCT Filed: Jan. 16, 2014

(86) PCT No.: PCT/JP2014/050622
§ 371 (c)(1),
(2) Date: Dec. 19, 2014

(87) PCT Pub. No.: WO2014/156224
PCT Pub. Date: Oct. 2, 2014

(65) Prior Publication Data
US 2016/0039015 A1 Feb. 11, 2016

(30) Foreign Application Priority Data

Mar. 26, 2013 (JP) ................... 2013-063621

(51) Int. Cl.
*B23C 5/20* (2006.01)
*B23C 5/22* (2006.01)
*B23C 5/06* (2006.01)

(52) U.S. Cl.
CPC ............... *B23C 5/207* (2013.01); *B23C 5/06* (2013.01); *B23C 5/20* (2013.01); *B23C 5/202* (2013.01);
(Continued)

(58) Field of Classification Search
CPC .. B23C 5/06; B23C 5/20; B23C 5/202; B23C 5/207; B23C 5/22; B23C 2200/367
See application file for complete search history.

(56) References Cited

U.S. PATENT DOCUMENTS 4,074,949 A * 2/1978 Hochmuth .......... B23B 27/1614
407/100
4,789,273 A * 12/1988 Wiacek ................. B23C 5/2213
407/34
(Continued)

FOREIGN PATENT DOCUMENTS

CN 102083577 A 6/2011
CN 102886572 A 1/2013
(Continued)

OTHER PUBLICATIONS

International Search Report issued in International Patent Application No. PCT/JP2014/050622 dated Apr. 22, 2014.
(Continued)

*Primary Examiner* — Sunil K Singh
*Assistant Examiner* — Ryan Rufo
(74) *Attorney, Agent, or Firm* — Oliff PLC (57) ABSTRACT

A cutting insert, used for a milling cutter, which includes two polygonal main surfaces that are opposite each other and a plurality of side faces and whose main surfaces are rake faces, whose side faces are flank faces, and whose ridge lines at positions where the main surfaces and the side faces cross each other are used as cutting edges include two major side surfaces that are opposite each other and a plurality of minor side surfaces that are formed continuously with the major side surfaces. A mounting hole is provided at the two major side surfaces in a direction in which the mounting hole extends therethrough, and areas of the two major side surfaces are greater than those of the main surfaces. The
(Continued)

major side surfaces and the minor side surfaces are provided with flutes along entire regions of the cutting edges.

4 Claims, 6 Drawing Sheets

(52) U.S. Cl.
CPC .... *B23C 2200/0494* (2013.01); *B23C 2200/128* (2013.01); *B23C 2200/286* (2013.01); *B23C 2200/367* (2013.01)

(56) References Cited

U.S. PATENT DOCUMENTS

| | | | | |
|---|---|---|---|---|
| 5,876,160 | A * | 3/1999 | Johnson | B23C 5/202 407/113 |
| 6,238,146 | B1 * | 5/2001 | Satran | B23B 27/1614 407/113 |
| 7,306,409 | B2 * | 12/2007 | Stabel | B23C 5/2213 407/113 |
| 2002/0066352 | A1 | 6/2002 | Satran et al. | |
| 2005/0169716 | A1 * | 8/2005 | Smilovici | B23C 5/2221 407/113 |
| 2006/0165828 | A1 * | 7/2006 | Smilovici | B22F 3/03 425/78 |
| 2007/0104546 | A1 * | 5/2007 | Maeta | B23C 5/06 407/113 |
| 2009/0136304 | A1 | 5/2009 | Satran et al. | |
| 2009/0155004 | A1 | 6/2009 | Jansson | |
| 2010/0158620 | A1 * | 6/2010 | Spitzenberger | B23C 5/006 407/40 |
| 2010/0266354 | A1 | 10/2010 | Zitzlaff et al. | |
| 2010/0290846 | A1 | 11/2010 | Hecht | |
| 2011/0164932 | A1 * | 7/2011 | Choi | B23C 5/06 407/40 |
| 2013/0336735 | A1 * | 12/2013 | Nam | B23C 5/06 407/113 |

FOREIGN PATENT DOCUMENTS

| | | | |
|---|---|---|---|
| DE | 102008002406 A1 * | 12/2009 | ............ B23C 5/207 |
| EP | 1 782 902 A2 | 5/2007 | |
| JP | A-2004-291205 | 10/2004 | |
| JP | 2006-272479 A * | 10/2006 | ............ B23C 5/20 |
| JP | 2008-229745 A | 10/2008 | |
| JP | A-2009-107051 | 5/2009 | |
| JP | A-2012-161907 | 8/2012 | |
| JP | 5040589 B2 | 10/2012 | |
| WO | 2008/155331 A1 | 12/2008 | |
| WO | 2012/099153 A1 | 7/2012 | |
| WO | WO 2012/099153 A1 * | 7/2012 | ........... B23C 5/2213 |

OTHER PUBLICATIONS

Nov. 23, 2015 Office Action issued in Chinese Patent Application No. 201480001929.4.

Feb. 9, 2016 Extended Search Report issued in European Patent Application No. 14773792.8.

* cited by examiner

CUTTING INSERT FOR A MILLING CUTTER

TECHNICAL FIELD

The present invention relates to a cutting insert that is used in a milling cutter, such as a face milling cutter.

BACKGROUND ART

As a cutting insert for a milling cutter, for example, a cutting insert that is described in Patent Literature 1 below is known.

The cutting insert in this document is usually what is called a vertical use type in which a face that is called a side face is a rake face.

In the cutting insert, in order to make it possible to use two side faces whose backs face each other as rake faces, faces through which a mounting hole extends (in general, faces that are called top and bottom faces) are made flat and parallel to each other. Here, "faces . . . are flat and parallel to each other" refer to faces that, when the side faces, which are rake faces, are flat, form an angle of 90 degrees with respect to the side faces.

In addition, in order to provide a clearance angle to one of the top and bottom faces having this form (for example, to a side that becomes a peripheral flank face) (that is, in order to provide clearance at a position where a corner that is opposite to a corner that is used does not interfere with a workpiece), the cutting insert is used by mounting it on a cutter body while the cutting insert is tilted in a direction in which a radial rake becomes blunt.

Further, in order to also provide a clearance angle to a face that becomes a front flank face (side face that is adjacent to the side faces that become rake faces), the top and bottom faces have parallelogram shapes.

CITATION LIST

Patent Literature

PTL 1: Japanese Unexamined Patent Application Publication No. 2004-291205

SUMMARY OF INVENTION

Technical Problem

In cutting inserts whose top and bottom faces have parallelogram shapes, the number of corners used is halved and costs are higher compared to those in cutting inserts of a vertical use type in which the top and bottom faces have square shapes.

Although all of the corners of cutting inserts whose top and bottom faces have square shapes can be used, in order to provide, with the square shape, a clearance angle for the face that becomes the front flank face, the cutting inserts need to be mounted on a cutter body while the cutting inserts are tilted in a direction in which an axial rake becomes blunt. This reduces sharpness.

When, in this state, the axial rake becomes blunt, the sharpness of a tool is increasingly reduced. In addition, when, in order to compensate for this problem, the rake face is tilted by a large amount, the strength of a blade edge is reduced.

Due to the aforementioned reasons, existing cutting inserts of a vertical use type for milling cutters have not been capable of satisfactorily meeting the demands of providing good sharpness, increasing the strength of a blade edge, and maximizing the number of corners used.

It is an object of the invention to meet the demands of providing good sharpness, increasing the strength of a blade edge, and maximizing the number of corners used.

Solution to Problem

To this end, in the invention, a cutting insert, used for a milling cutter, which includes two polygonal main surfaces that are opposite each other and a plurality of side faces that are formed continuously with the sides of the main surfaces, and whose main surfaces are rake faces, whose side faces are flank faces, and whose ridge lines at positions where the main surfaces and the side faces cross each other are used as cutting edges has the following structure.

That is, the plurality of side faces include two major side surfaces that are opposite each other and a plurality of minor side surfaces that are formed continuously with the major side surfaces, a mounting hole is provided at the two major side surfaces in a direction in which the mounting hole extends therethrough, and areas of the two major side surfaces are greater than those of the main surfaces. In addition, the major side surfaces and the minor side surfaces are provided with flutes along entire regions of the cutting edges, and flute faces of the flutes at a side along the cutting edges are tilted in a direction in which depths gradually increase with increasing distance from the cutting edges.

Advantageous Effects of Invention

In the cutting insert according to the invention, the side faces that are flank faces are provided with flutes like breaker flutes along the cutting edges. These flutes make it possible to provide sufficient clearance near blade edges.

Therefore, restrictions on tool design (restrictions on mounting orientation of the cutting insert with respect to a cutter body) is reduced, and reductions in the axial rake and the radial rake are reduced, thereby making it possible to provide good sharpness.

Since clearance can be provided near the blade edges by the flutes in the flank faces, a method for compensating for the case in which the axial rake and the radial rake are made blunt by increasing the tilt angles of the rake faces is not required. Therefore, sufficient strength of the blade edges can be provided.

DESCRIPTION OF EMBODIMENTS

Embodiments of a cutting insert for a milling cutter according to the invention are hereunder described on the basis of FIGS. 1 to 13 of the attached drawings.

FIGS. 1 to 5 show an embodiment of the cutting insert used in, for example, a corner-cutting milling cutter. The cutting insert 1 includes two polygonal main surfaces 2 and 2 that are opposite each other and a plurality of side faces each formed continuously with the corresponding sides of the main surfaces.

Figure 1:
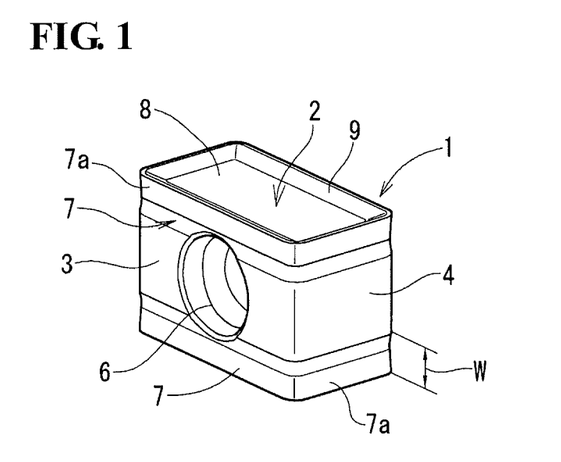
FIG. 1 is a perspective view of a cutting insert according to an embodiment of the invention.
Figure 2:
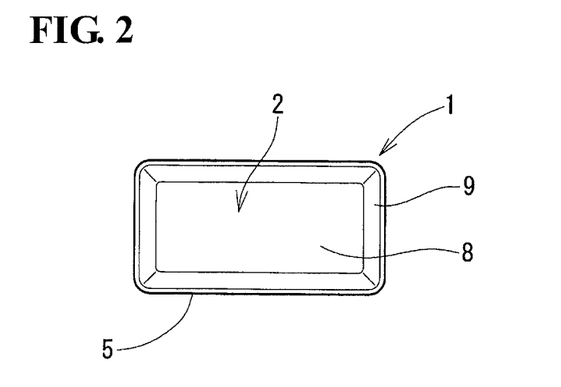
FIG. 2 shows a main surface of the cutting insert shown in FIG. 1.

In the illustrated cutting insert 1, the main surfaces 2 whose contours are rectangular are used as rake faces, the side faces are used as flank faces, and ridge lines at positions where the main surfaces 2 cross the side faces are used as cutting edges 5.

Figure 3:
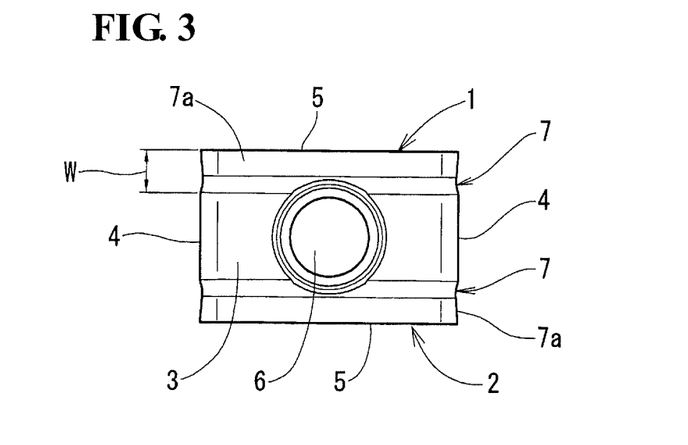
FIG. 3 shows a major side surface of the cutting insert shown in FIG. 1.

The side faces include two major side surfaces 3 and 3 that are opposite each other and minor side surfaces 4 formed continuously with the major side surfaces 3 and 3. A mounting hole 6 is provided at the major side surfaces 3 and 3 in a direction in which the mounting hole extends therethrough. One of the major side surfaces 3 is a flank face, and the other major side surface 3 is used as a seat face with respect to a support seat. The areas of the major side surfaces 3 are greater than those of the main surfaces 2.

Figure 4:
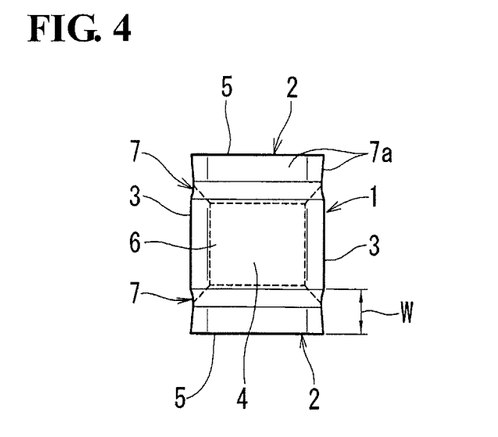
FIG. 4 shows a minor side surface of the cutting insert shown in FIG. 1.

The minor side surfaces 4 are formed continuously with the short sides of the main surfaces 2 and the major side surfaces 3. When the major side surfaces 3 each have a shape including four sides (basic shape is a square shape or a parallelogram shape), the number of minor side surfaces 4 is two. The number of minor side surfaces 4 may increase to two or more depending upon the shapes of the major side surfaces 3 (the number of minor side surfaces 4 is two less than the total number of sides of each major side surface).

The ridge lines at the positions where the main surfaces 2 cross the major side surfaces 3 and the ridge lines at the positions where the main surfaces 2 cross the minor side surfaces 4, that is, all of the sides of the main surfaces 2 are used as the cutting edges 5.

Figure 5:
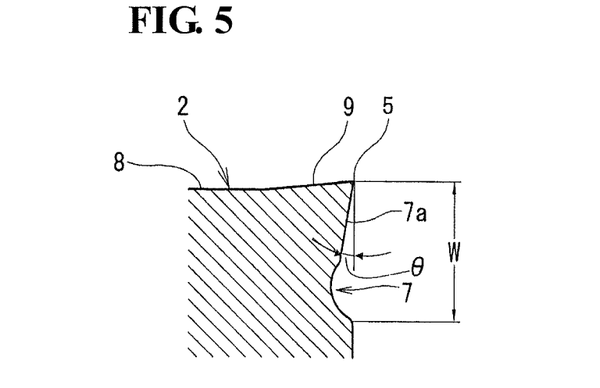
FIG. 5 is an enlarged sectional view of a flute in a side face of the cutting insert shown in FIG. 1.

Flutes 7 are formed in the major side surfaces 3 and the minor side surfaces 4 along the entire regions of the cutting edges 5. As shown in FIG. 5, in each flute 7, a flute face 7a at a side along the cutting edge 5 is tilted at an angle θ in a direction in which the depth gradually increases with increasing distance from the cutting edge 5. By this tilt, the flank faces (side faces) at the vicinity of the cutting edges are provided with a clearance angle, so that even if the cutting insert is not tilted in the direction in which the axial rake or the radial rake becomes blunt, interference of the flank faces in the vicinity of the cutting edges with a workpiece is prevented from occurring.

When the tilt angle θ of the flute face 7a of each flute 7 is set at an angle that is greater than or equal to 2 degrees, interference of the cutting insert with a workpiece is reliably prevented, which is desirable. An upper limit of the tilt angle θ may be on the order of 10 degrees for suppressing a reduction in the strength of the blade edge.

It is desirable that a flute width W of each flute 7 be greater than or equal to 0.5 mm and less than or equal to 5 mm. When each flute width W is greater than or equal to 0.5 mm, it is possible to reliably prevent interference with a workpiece.

In cutting inserts of what is called a horizontal mount type that are used by being oriented with a major side surface being a rake face, the thickness of a face that becomes a flank face is small. Therefore, when the same flute is provided in the face, it is difficult to provide a flute width that reliably prevents interference. However, in cutting inserts of a vertical use type, it is possible to provide a sufficient flute width that is required to prevent interference.

Although it is better for the flute width W to be large from the viewpoint of preventing interference, since unnecessarily increasing the flute width W causes a reduction in the area of the seat face of the cutting insert, the upper limit of the flute width W is 5 mm.

Seating flat lands 8 are provided in central portions of the main surfaces 2 surrounded by the flutes 7. As shown in FIG. 1, when the positions of the flat lands 8 are lower than the positions of the cutting edges 5 in a height direction, it is possible to make sharp the blade edges by tilting the rake faces (regions of the main surfaces 2 along the cutting edges 5) 9.

The positions of the flat lands 8 may be at the same level as the positions of the cutting edges 5 in the height direction. When the blade edge strength is important, this structure is advantageous.

Although, in the cutting insert 1 shown in FIG. 1, the major side surfaces 3 have rectangular shapes (in which the flutes 7 of the minor side surfaces 4 are ignored), the major side surfaces 3 may have polygonal shapes having an even number of corners of four or more.

A cutting insert 1A shown in FIGS. 6 to 9 uses a face milling cutter, each cutting edge 5 including a minor cutting edge 5b that is formed continuously with a corresponding major cutting edge 5a at a predetermined angle.

Figure 6:
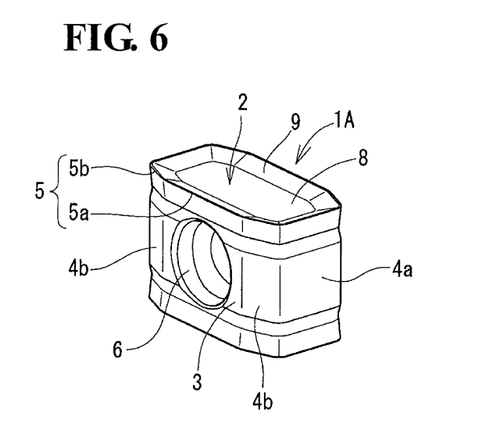
FIG. 6 is a perspective view of a cutting insert according to another embodiment of the invention.
Figure 7:
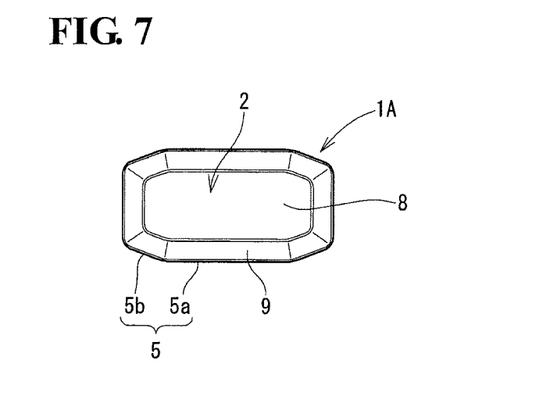
FIG. 7 shows a main surface of the cutting insert shown in FIG. 6.
Figure 8:
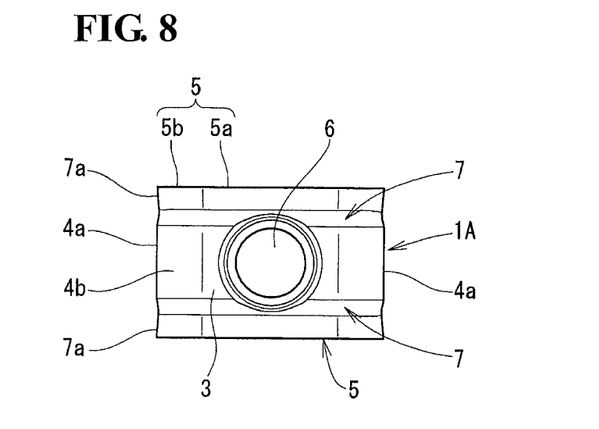
FIG. 8 shows a major side surface of the cutting insert shown in FIG. 6.
Figure 9:
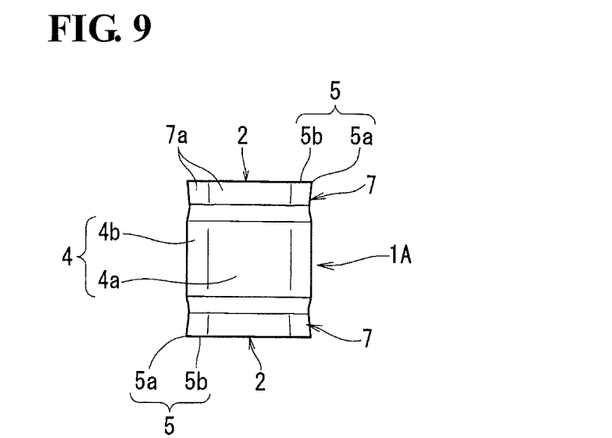
FIG. 9 shows a minor side surface of the cutting insert shown in FIG. 6.
Figure 10:
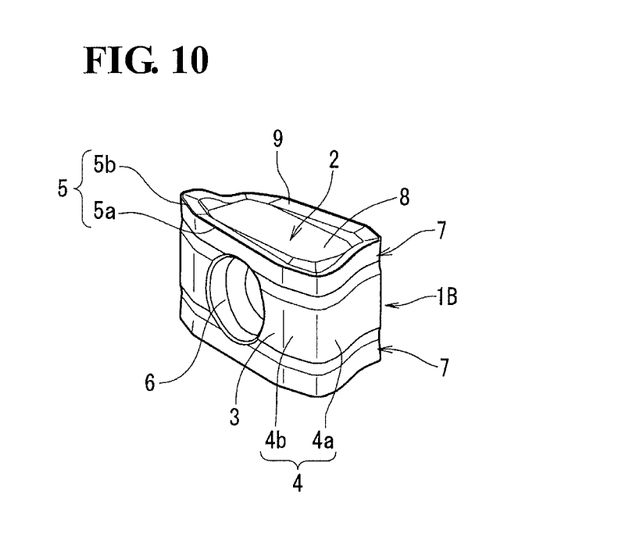
FIG. 10 is a perspective view of a cutting insert according to still another embodiment of the invention.
Figure 11:
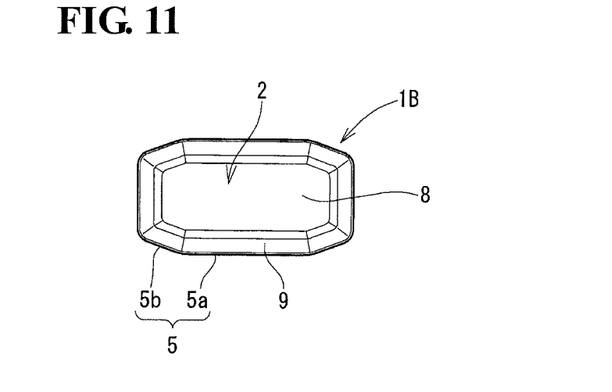
FIG. 11 shows a main surface of the cutting insert shown in FIG. 10.
Figure 12:
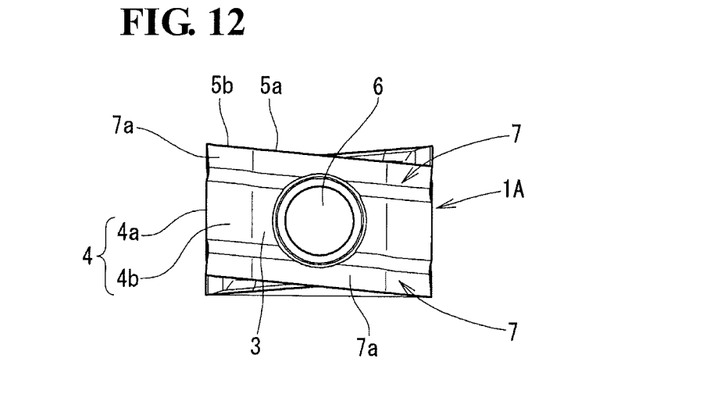
FIG. 12 shows a major side surface of the cutting insert shown in FIG. 10.
Figure 13:
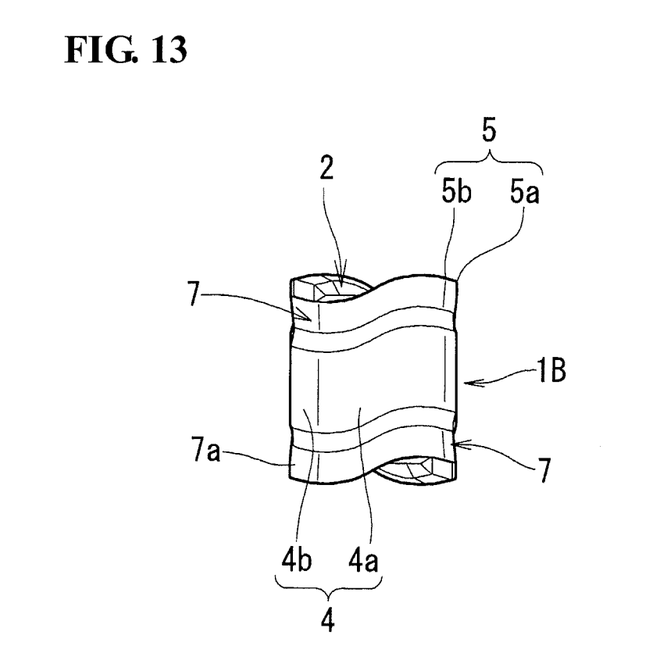
FIG. 13 shows a minor side surface of the cutting insert shown in FIG. 10.

The cutting insert 1A processes a workpiece by being mounted on a cutter body as a result of being oriented in such a manner that each minor cutting edge 5b is substantially perpendicular to an axis of the cutter, and by forming each major cutting edge 5a as an edge having a predetermined approach angle.

When the milling cutter including the cutting insert 1A is used, a feed mark that is formed on a machined surface is removed by its corresponding minor cutting edge 5b, so that the precision of the machined surface is increased. The minor cutting edges 5b are provided according to use, and are not required elements of the cutting insert according to the invention.

The cutting insert 1 of the two forms mentioned above is rotated by 180 degrees or reversely rotated by 180 degrees to change places of the corners of the main surfaces, so that the contour shapes of the main surfaces before and after the rotation or before and after the reverse rotation overlap each other.

Therefore, four corners are usable for right-hand use and four corners are usable for left-hand use, so that a total of eight corners are usable. As shown in FIGS. 10 to 13, each major side surface 3 may have a parallelogram shape.

Although, in this form, the number of corners used is halved compared to that in already existing forms, as shown in the figures, it is possible to provide a form in which sharpness and machining efficiency are considered as being important while suppressing a reduction in blade edge strength as a result of changing the positions of the cutting edges 5 in the height direction.

Figure 14:
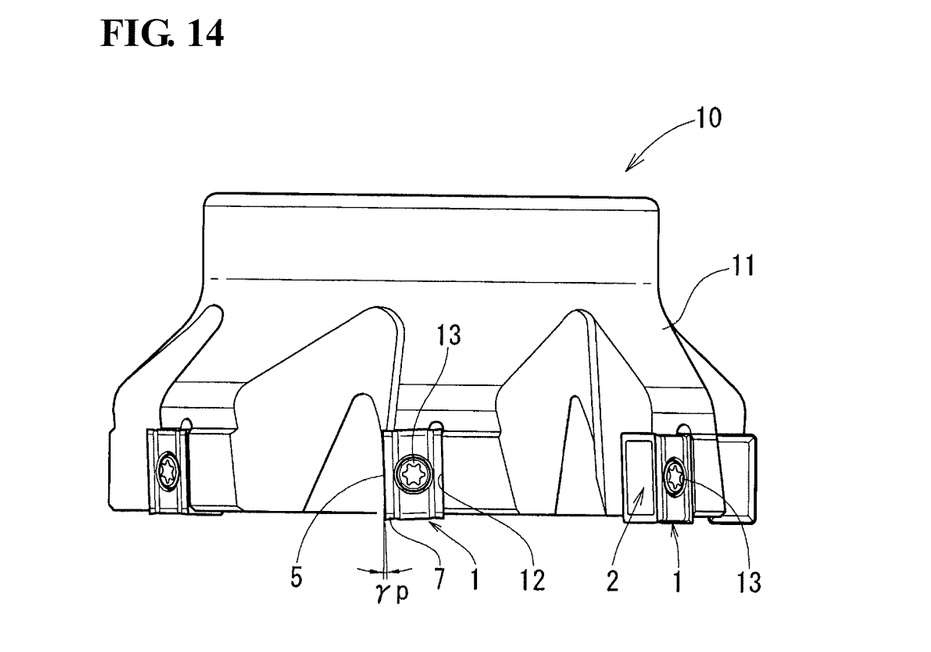
FIG. 14 is a side view of a corner-cutting milling cutter using the cutting insert shown in FIG. 1.
Figure 15:
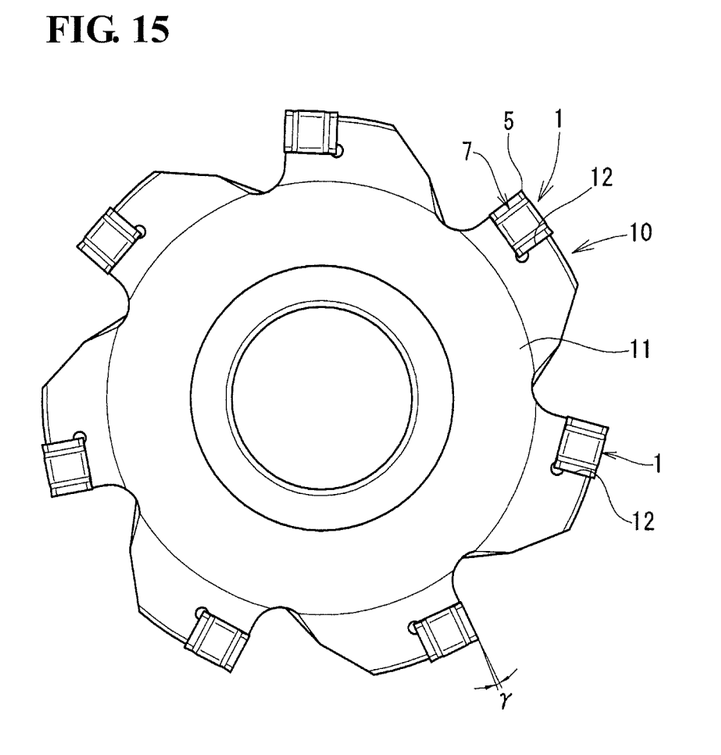
FIG. 15 is a front view of the corner-cutting milling cutter shown in FIG. 13.
Figure 16:
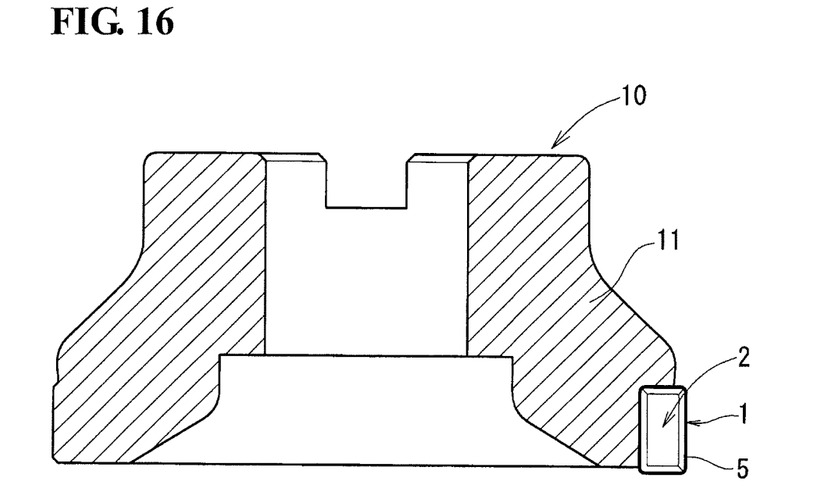
FIG. 16 is a sectional view of the corner-cutting milling cutter shown in FIG. 13.

A milling cutter according to an embodiment of the invention is shown in FIGS. 14 to 16. The milling cutter 10 according to the embodiment is a corner-cutting milling cutter using the cutting insert 1 shown in FIG. 1.

By providing the major side surfaces 3 and the minor side surfaces with flutes 7, the milling cutter 10 is such that a mounting operation with respect to a support seat 12 at an outer periphery of an end of a cutter body 11 may be performed with an axial rake γp shown in FIG. 14 and a radial rake γ shown in FIG. 15 being close to zero degrees.

Therefore, good sharpness is provided, and, since blade edges do not need to be considerably sharpened, blade edge strength is also provided. Depending upon use, all corners of the two main surfaces 2 and 2 are usable, so that it is possible to meet the demand of reducing tool costs.

The structures of the embodiments of the invention disclosed above are strictly exemplifications, so that the scope of the present invention is not limited to the scope of the descriptions thereof. The scope of the present invention is indicated by the statements of the claims, and includes all modifications within the scope and meaning of equivalents to the statements of the claims.

REFERENCE SIGNS LIST 1 cutting insert
2 main surface
3 major side surface
4 minor side surface
5 cutting edge
6 mounting hole
7 flute
8 flat land
9 rake face (region of main surface along cutting edge)
W flute width
10 corner-cutting milling cutter
11 cutter body
12 support seat
13 clamp bolt

The invention claimed is:

1. A cutting insert for a milling cutter, the cutting insert comprising:
   two polygonal main surfaces that oppose each other and a plurality of side faces that are formed continuously with the sides of the main surfaces, the main surfaces being rake faces, the side faces being flank faces, and ridge lines at positions where the main surfaces and the side faces cross each other being used as cutting edges, wherein:
   the plurality of side faces include two major side surfaces that oppose each other and a plurality of minor side surfaces that are formed continuously with the major side surfaces, a mounting hole is provided at the two major side surfaces in a direction in which the mounting hole extends therethrough, and areas of the two major side surfaces are greater than those of the main surfaces,
   the major side surfaces and the minor side surfaces are provided with flutes along entire regions of the cutting edges, each flute consisting of: (i) a flute face tilted in a direction in which depths gradually increase with increasing distance from the cutting edge, and (ii) a concave arc face connected with a top face of a main side surface and a lowest point of the arc face is lower than the top face of the main side surface.

2. The cutting insert for the milling cutter according to claim 1, wherein
   a tilt angle of the flute face of each flute at the side along the cutting edge is greater than or equal to 2 degrees, and
   a flute width of each flute is greater than or equal to 0.5 mm and less than or equal to 5 mm.

3. The cutting insert for the milling cutter according to either claim 1, wherein
   a central portion of each main surface is provided with a flat land that is seated on a support seat of a cutter body, and
   with positions of the flat lands being lower than positions of the cutting edges, the rake faces that are tilted are provided between the cutting edges and the flat lands.

4. The cutting insert for the milling cutter according to either claim 2, wherein
   a central portion of each main surface is provided with a flat land that is seated on a support seat of a cutter body, and
   with positions of the flat lands being lower than positions of the cutting edges, the rake faces that are tilted are provided between the cutting edges and the flat lands.

* * * * *